US010028117B1

(12) United States Patent
Ben Haim et al.

(10) Patent No.: US 10,028,117 B1
(45) Date of Patent: Jul. 17, 2018

(54) SYSTEMS AND METHODS FOR AUTOMATED INSTALLATION OF CONTENT ITEMS ON MOBILE DEVICES

(71) Applicant: Digital Turbine, Inc., Austin, TX (US)

(72) Inventors: Lior Ben Haim, Karkur (IL); Moni Haimovich, RaAnana (IL)

(73) Assignee: Digital Turbine, Inc., Austin, TX (US)

( * ) Notice: Subject to any disclaimer, the term of this patent is extended or adjusted under 35 U.S.C. 154(b) by 0 days.

(21) Appl. No.: 15/446,075

(22) Filed: Mar. 1, 2017

(51) Int. Cl.
   H04M 3/42      (2006.01)
   H04W 4/60      (2018.01)
   H04W 4/00      (2018.01)
   H04W 8/00      (2009.01)

(52) U.S. Cl.
   CPC ............. H04W 4/60 (2018.02); H04W 4/003 (2013.01); H04W 8/005 (2013.01)

(58) Field of Classification Search
   CPC ......... H04W 4/12; H04W 4/02; H04W 8/245; H04L 12/5895; H04L 29/08657; H04L 29/08108; H04M 3/533; H04M 2207/18; H04M 1/72525
   USPC ..... 455/412.1–414.3, 418–420, 456.1–456.3
   See application file for complete search history.

(56) References Cited

U.S. PATENT DOCUMENTS

| 7,516,078 | B2 * | 4/2009 | Dhawan | H04M 1/7253 379/87 |
| 8,326,271 | B2 * | 12/2012 | Satake | H04L 12/1859 379/93.17 |
| 8,549,150 | B1 * | 10/2013 | Roseman | H04N 21/2181 370/351 |
| 8,990,420 | B2 * | 3/2015 | Glasser | H04L 67/1008 370/312 |
| 9,223,657 | B2 * | 12/2015 | Zheng | G06F 11/1402 |
| 9,288,610 | B2 * | 3/2016 | Son | H04W 4/005 |
| 2006/0018314 | A1 * | 1/2006 | Lai | H04L 1/188 370/389 |
| 2008/0242290 | A1 * | 10/2008 | Bhatia | H04L 51/38 455/422.1 |
| 2009/0215477 | A1 * | 8/2009 | Lee | H04L 51/38 455/466 |
| 2010/0255772 | A1 * | 10/2010 | Hellman | G11B 27/034 455/3.06 |
| 2012/0057456 | A1 * | 3/2012 | Bogatin | H04W 28/08 370/230.1 |
| 2017/0099690 | A1 * | 4/2017 | Hooli | H04W 76/023 |

* cited by examiner

*Primary Examiner* — Dai A Phuong

(57) ABSTRACT

There is provided a computer implemented method for distribution and installation of a content item on mobile devices, the method executed by a first mobile device, the method comprising: receiving from a server over a cellular communication channel, instructions for automatic installation of the content item, wherein the content item is stored by the server, transmitting to at least one second mobile device, a query to determine whether the at least one second mobile device has installed thereon the content item, establishing a non-cellular communication channel with a group of the at least one second mobile devices that have the content item installed thereon, receiving over the non-cellular communication channel, the content item from at least one member of the group of the at least one second mobile devices, automatically installing the content item according to the instructions, and presenting an indication of the automatically installed content item.

17 Claims, 8 Drawing Sheets

SYSTEMS AND METHODS FOR AUTOMATED INSTALLATION OF CONTENT ITEMS ON MOBILE DEVICES

FIELD AND BACKGROUND OF THE INVENTION

The present invention, in some embodiments thereof, relates to content items of mobile devices and, more specifically, but not exclusively, to systems and methods for automated installation of content items on mobile devices.

Certain content items, for example applications (apps) are pre-loaded on mobile devices before purchase by a customer. For example, mobile operators (that provide cellular services to the mobile device) or other parties may select which content items to pre-install on the mobile devices.

SUMMARY OF THE INVENTION

According to a first aspect, a computer implemented method for distribution and installation of a content item on mobile devices, the method executed by a first mobile device, comprises: receiving from a server over a cellular communication channel, instructions for automatic installation of the content item, wherein the content item is stored by the server, transmitting to at least one second mobile device, a query to determine whether the at least one second mobile device has installed thereon the content item, establishing a non-cellular communication channel with a group of the at least one second mobile devices that have the content item installed thereon, receiving over the non-cellular communication channel, the content item from at least one member of the group of the at least one second mobile devices, automatically installing the content item according to the instructions, and presenting an indication of the automatically installed content item.

According to a second aspect, a system for distribution and installation of content items on mobile devices, comprises: a non-transitory memory having stored thereon a code for execution by at least one processor of a first mobile device adapted to execute the code, the code comprising: code for receiving during a booting process, from a server over a cellular communication channel, instructions for automatic installation of the content item, wherein the content item is stored by the server, code for transmitting to at least one second mobile device, a query to determine whether the at least one second mobile device has installed thereon the content item, code for establishing a non-cellular communication channel with a group of the at least one second mobile devices that have the content item installed thereon, and code for receiving over the non-cellular communication channel, the content item from at least one member of the group of the at least one second mobile devices, code for automatically installing the content item according to the instructions, and code for presenting an indication of the automatically installed content item.

According to a third aspect, a computer program product comprising a non-transitory computer readable storage medium storing program code thereon for implementation by at least one processor of a first mobile device, comprises: instructions for receiving during a booting process, from a server over a cellular communication channel, instructions for automatic installation of the content item, wherein the content item is stored by the server, instructions for transmitting to at least one second mobile device, a query to determine whether the at least one second mobile device has installed thereon the content item, instructions for establishing a non-cellular communication channel with a group of the at least one second mobile devices that have the content item installed thereon, and instructions for receiving over the non-cellular communication channel, the content item from at least one member of the group of the at least one second mobile devices, instructions for automatically installing the content item according to the instructions, and instructions for presenting an indication of the automatically installed content item.

The systems and/or methods (e.g., implemented as code instructions stored in a data storage device executed by one or more processors) described herein present a technical solution to the technical problem of automatically loading content item(s) (which are stored on a server(s), for example, within a computing cloud) on a large number of mobile devices, for example, on the order of thousands, tens of thousands, hundreds of thousands, million, tens of millions, hundreds of millions, and billions. The technical problem relates to simultaneous access of the server(s) by the large number of mobile devices overloading the server and/or network connecting between the mobile devices and the server.

The systems and/or methods (e.g., implemented as code instructions stored in a data storage device executed by one or more processors) described herein improve the performance of existing server(s) that store content for delivery to mobile devices, and/or network(s) connecting between the server(s) and the mobile devices, by reducing the computational resources of the server(s) (e.g., processor(s), connection ports, storage) and/or by reducing the networking resources (e.g., network bandwidth, network utilization) of the network connecting the server(s) and the mobile devices. As described herein, the mobile devices establish local non-cellular network connections between each other, in which a certain mobile device downloads the content item(s) designated for automatic installation from another mobile device, rather than the certain mobile device using a cellular connection to download the content item(s) from the server over a network.

In a first possible implementation of the system according to the first aspect or the method according to the second aspect or the computer program product according to the third aspect, the system, the method, and the computer program product further comprise code and/or instructions for performing before the transmitting: searching for signals broadcasted by at least one second mobile device, wherein the establishing the non-cellular communication channel is performed with the at least one second mobile device that broadcasted the signals, and wherein the transmitting the query is performed after the establishment of the non-cellular communication channel.

In a second possible implementation form of the system according to the first aspect as such, or the method according to the second aspect as such, or the computer program product according to the third aspect as such, or according to any of the preceding forms of the first or second or third aspects, the system, the method, and the computer program product further comprise code and/or instructions for computing, a division of the content item into a plurality of segments, transmitting over the non-cellular communication channels to a certain member of the group of the at least one second mobile devices, a request to receive a certain segment of the content item, receiving over the non-cellular communication channels, from the certain member of the group of the at least one second mobile devices, the certain segment of the content item, and iterating the transmitting and the receiving for all segments of the plurality of segments of the content item, wherein automatically installing the content item comprises automatically installing the content item using the plurality of segments, according to the instructions.

In a third possible implementation form according to the second possible implementation, at least two segments of the content item are each respectively requested from at least two members of the group of the at least one second mobile devices.

In a fourth possible implementation form according to the second or third possible implementations, the plurality of segments of the content item are received in a non-sequential order, by iterating the transmitting the request of a next segment when an earlier segment is received.

In a fifth possible implementation form according to the second or third or fourth possible implementations, requests for different segments of the content item are transmitted substantially in parallel to different members of the group of the at least one second mobile device, and the plurality of segments of the content item are received substantially in parallel from the different members of the group of the at least one second mobile device.

In a sixth possible implementation form of the system according to the first aspect as such, or the method according to the second aspect as such, or the computer program product according to the third aspect as such, or according to any of the preceding forms of the first or second or third aspects, when no non-cellular communication channels are established with any second mobile devices, the content item is received from the server over the cellular communication channel.

In a seventh possible implementation form of the system according to the first aspect as such, or the method according to the second aspect as such, or the computer program product according to the third aspect as such, or according to any of the preceding forms of the first or second or third aspects, the system, the method, and the computer program product further comprise code and/or instructions for receiving from a third mobile device, a request for at least one segment of the automatically installed content item, establishing the non-cellular communication channel with the third mobile device, and transmitting over the non-cellular communication channel the at least one segment of the content item to the third mobile device.

In an eighth possible implementation form according to the seventh possible implementation, the system, the method, and the computer program product further comprise code and/or instructions for performing prior to the receiving the request from the third mobile device: broadcasting signals indicative of availability to establish a non-cellular communication channel, and receiving from the third mobile device, a request to establish the non-cellular communication channel.

In a ninth possible implementation form of the system according to the first aspect as such, or the method according to the second aspect as such, or the computer program product according to the third aspect as such, or according to any of the preceding forms of the first or second or third aspects, the instructions for automatic installation of the content item are received from the server during a first booting of the first mobile device.

In a tenth possible implementation form of the system according to the first aspect as such, or the method according to the second aspect as such, or the computer program product according to the third aspect as such, or according to any of the preceding forms of the first or second or third aspects, the instructions for automatic installation of the content item are received from the server during at least one of: a reset of the first mobile device, and a reboot after shutdown of the first mobile device.

In an eleventh possible implementation form of the system according to the first aspect as such, or the method according to the second aspect as such, or the computer program product according to the third aspect as such, or according to any of the preceding forms of the first or second or third aspects, the content item is a member selected from the group consisting of: a new application, an update to an existing installed application, an android application package (APK), a media content item, a video, a picture, an image, a contact for a social network application, and an advertisement.

In a twelfth possible implementation form of the system according to the first aspect as such, or the method according to the second aspect as such, or the computer program product according to the third aspect as such, or according to any of the preceding forms of the first or second or third aspects, the first mobile device is a member selected from the group consisting of: smartphone, glasses computer, and watch computer.

In a thirteenth possible implementation form of the system according to the first aspect as such, or the method according to the second aspect as such, or the computer program product according to the third aspect as such, or according to any of the preceding forms of the first or second or third aspects, the cellular communication channel is a network connection over a cellular network of a wireless service provider that connects to the first mobile device using a radio access network of the wireless service provider, and the non-cellular communication channel is a short range non-cellular wireless communication channel that establishes direct communication with each of the at least one second mobile devices without using a wireless access point (WAP).

In a fourteenth possible implementation form of the system according to the first aspect as such, or the method according to the second aspect as such, or the computer program product according to the third aspect as such, or according to any of the preceding forms of the first or second or third aspects, the cellular communication channel is a member selected from the group consisting of: long term evolution (LTE), WiMax, HSPA, EV-DO, and wherein the non-cellular communication channel is a member selected from the group consisting of: Bluetooth® Direct, Wi-Fi Direct®.

In a fifteenth possible implementation form of the system according to the first aspect as such, or the method according to the second aspect as such, or the computer program product according to the third aspect as such, or according to any of the preceding forms of the first or second or third aspects, the instructions to access the server, and the automatic installation of the content item are stored as code having at least one of: a permission level that executes without requiring user approval, and that prevents intervention by the user during the automatic installation of the content item.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
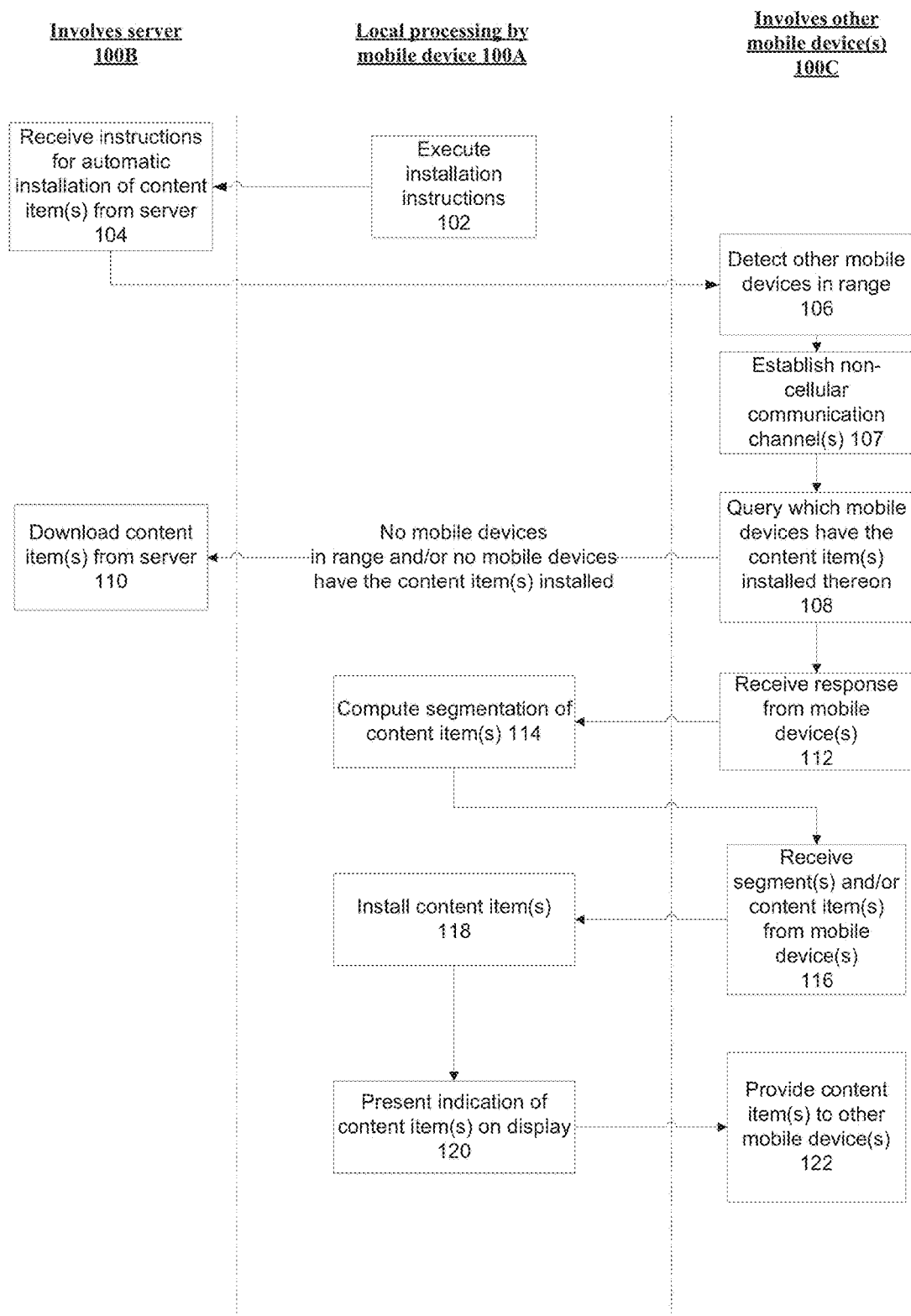
FIG. 1 is a flowchart of a method for distribution and automatic installation of content item(s) on one or more mobile devices, in accordance with some embodiments of the present invention.

The present invention, in some embodiments thereof, relates to content items of mobile devices and, more specifically, but not exclusively, to systems and methods for automated installation of content items on mobile devices.

An aspect of some embodiments of the present invention relates to systems and/or methods (e.g., code instructions stored in a data storage device executed by one or more processors) that instruct a mobile device to access another mobile device (e.g. during execution of a booting process, and/or during another time when the mobile device is operating), using a non-cellular communication channel, to receive predefined content item(s) from the another mobile device, rather than accessing a server using a cellular communication channel to download the content item(s) from the server. The mobile device may access the server (e.g., during the booting process or during another time when the mobile device is operating) to obtain instructions for installation of the content item(s). Predefined content item(s) (e.g., as defined by the mobile operator and/or another party) may be automatically installed on the mobile device (e.g., during the booting process or during another time when the mobile device is operating), without necessarily requiring user approval and/or without necessarily allowing the user to intervene during the automatic installation process. Transmission of the content item(s) from one mobile device (that stores the content item(s)) to another mobile device (that is instructed to install the content item(s)) reduces the computation load of the server and/or reduces network traffic over the network(s) that connects the mobile device to the server, since the mobile device is not directed to download the content item(s) from the server.

Optionally, the mobile device searches for a broadcast from the other mobile device(s) indicative of availability to establish the non-cellular communication channel(s). The mobile device may transmit a query to the broadcasting mobile devices to determine which mobile device have the content item(s) installed thereon. The mobile device establishes the non-cellular communication channel with one or more of the broadcasting mobile devices, optionally with the mobile devices that responded positively to the query (i.e., that the content item(s) is installed on the respective mobile device). Alternatively, the non-cellular communication channel(s) is established, with the query to determine which mobile devices have the content item(s) installed thereon transmitted over the established non-cellular communication channel(s). The non-cellular communication channel(s) with mobile devices that do not have the content item(s) installed thereon may be terminated.

Optionally, the non-cellular communication channel is implemented using a direct wireless communication channel that is established between two or more mobile devices, without necessarily using a wireless access point (WAP) and/or another intermediate computing device for transmission of data between the mobile devices.

Optionally, the cellular communication channel used by the mobile device to communicate with the server (e.g., to download instructions defining which application to automatically install) may include standard mobile and/or wireless networks, that provides a network connection to the server.

Optionally, the mobile device that automatically installed the content item(s), which acted as a client in receiving the content item(s) from the other mobile device, may act as a server by providing the recently installed content item(s) to another mobile device that is attempting to install the content item(s). Content item(s) may be propagated to a large number of mobile devices, by being individually transmitted from one mobile device to another mobile device, using established non-cellular communication channels, rather than the large number of mobile devices attempting to access a common server, which may overload the serve and/or overload the network connecting between the server and the large number of mobile devices.

Optionally, the mobile device may receive the content item(s) from two or more mobile devices (that store the content item(s) thereon) across established non-cellular communication channels. The mobile device may compute segments for the content item(s), and request different segments from different mobile devices. The segments may be received in parallel from the different mobile devices, received sequentially, or received in a non-sequential order from the different mobile devices or from a single mobile device. The mobile device assembles the segments into the content item(s), and installs the assembled content item(s) thereon. When one or more segments fail to be received by the mobile device (e.g., the providing mobile device has moved out of range, terminating the non-cellular communication channel), the mobile device may request the missing segments from another mobile device using the established non-cellular communication channel.

The systems and/or methods (e.g., implemented as code instructions stored in a data storage device executed by one or more processors) described herein present a technical solution to the technical problem of automatically loading content item(s) (which are stored on a server(s), for example, within a computing cloud) on a large number of mobile devices, for example, on the order of thousands, tens of thousands, hundreds of thousands, million, tens of millions, hundreds of millions, and billions. The technical problem relates to simultaneous access of the server(s) by the large number of mobile devices overloading the server and/or network connecting between the mobile devices and the server.

The systems and/or methods (e.g., implemented as code instructions stored in a data storage device executed by one or more processors) described herein improve the performance of existing server(s) that store content for delivery to mobile devices, and/or network(s) connecting between the server(s) and the mobile devices, by reducing the computational resources of the server(s) (e.g., processor(s), connection ports, storage) and/or by reducing the networking resources (e.g., network bandwidth, network utilization) of the network connecting the server(s) and the mobile devices. As described herein, the mobile devices establish local non-cellular network connections between each other, in which a certain mobile device downloads the content item(s) designated for automatic installation from another mobile device, rather than the certain mobile device using a cellular connection to download the content item(s) from the server over a network.

The systems and/or methods (e.g., implemented as code instructions stored in a data storage device executed by one or more processors) described herein tie mathematical operations (e.g., establishing cellular and/or non-cellular network connections) to the ability of processor(s) to execute code instructions. The systems and/or methods (e.g., implemented as code instructions stored in a data storage device executed by one or more processors) described herein are tied to physical real-life components, including mobile devices, server(s), and network equipment.

Accordingly, the systems and/or methods (e.g., implemented as code instructions stored in a data storage device executed by one or more processors) described herein are necessarily rooted in networking and/or computer technology to overcome an actual technical network centric problem arising in the technical field of distributing content item(s) to mobile devices over a network connection.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, the terms broadcast signal, broadcast signals, and broadcast message(s) are interchangeable.

Figure 2:
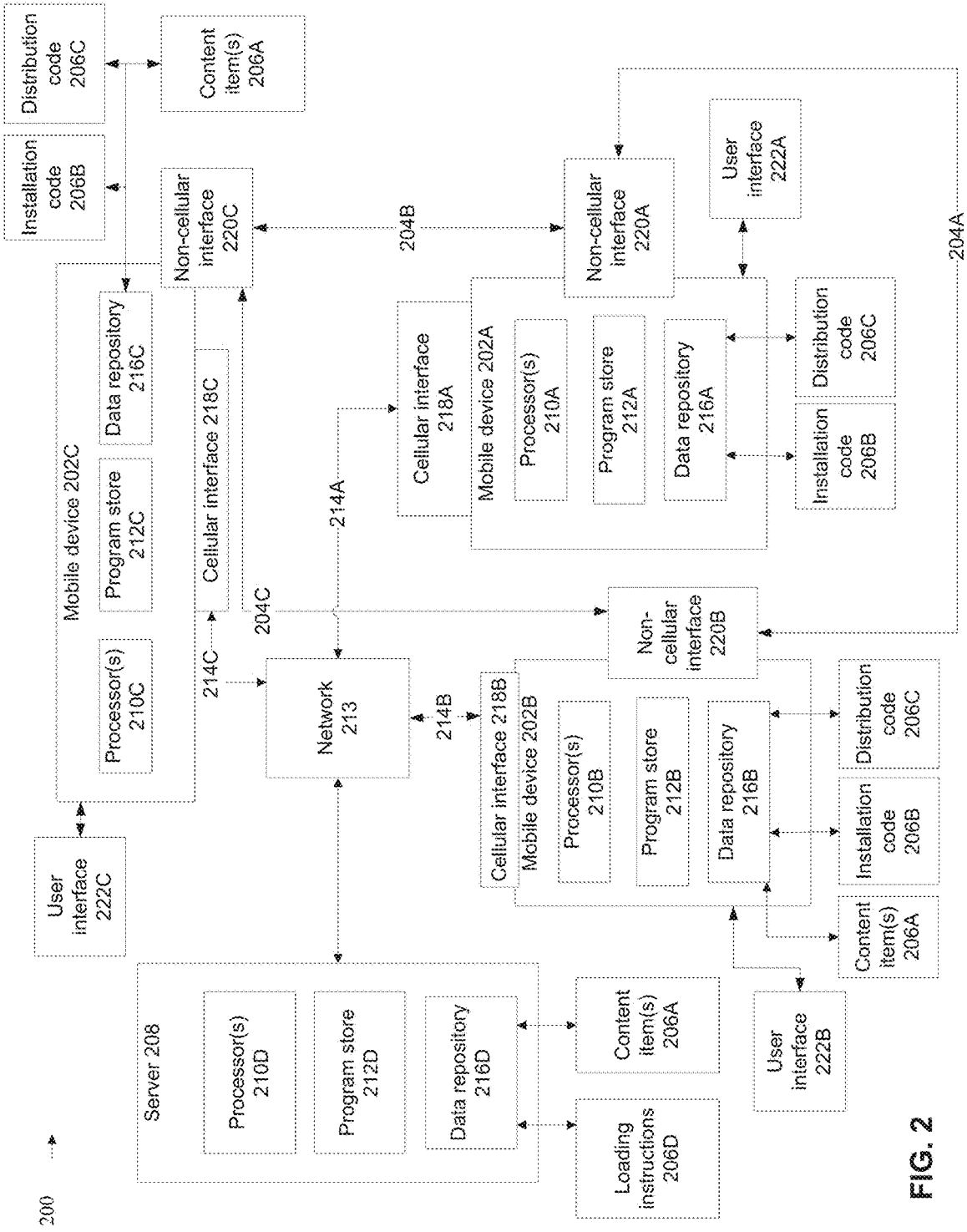
FIG. 2 is a block diagram of components of a system that distributes and automatically installs content item(s) on one or more mobile devices, in accordance with some embodiments of the present invention.

Reference is now made to FIG. 1, which is a flowchart of a method for distribution and automatic installation of content item(s) on one or more mobile devices, based on transfer of the content item(s) over a non-cellular communication channel where a certain mobile device(s) provides the content item(s) to another mobile device during a booting process of and/or during another time when the another mobile device is operating, where the content item(s) were originally received from a server over a cellular communication channel and/or over a wireless network communication channel (e.g., WiFi), in accordance with some embodiments of the present invention. Reference is also made to FIG. 2, which is a block diagram of components of a system 200 that includes mobile devices 202A-C that establish non-cellular communication channels 204A-C to distribute content item(s) 206A from one mobile device to another mobile device (e.g., during a booting process of the another mobile device and/or during another time when the another mobile device is operating), where content item(s) 206A were originally automatically received from server 208 over the cellular communication channel and locally installed when executing code instructions during a booting process and/or during another time during operation of one or more mobile devices, in accordance with some embodiments of the present invention.

System 200 includes mobile devices 202A-C (three are shown for exemplary purposes, but it is understood that the number of mobile devices may be more than three, for example, on the order of 10s, 100s, 1000s, 10000s, 100000s, 1000000s, 10000000s, 100000000s, 1000000000s), for example, smartphone, tablet, wearable computer, glasses, computer, and watch computer.

Each mobile device 202A-C includes one or more processor(s) 210A-C, for example, central processing unit(s) (CPU), graphics processing unit(s) (GPU), field programmable gate array(s) (FPGA), digital signal processor(s) (DSP), and application specific integrated circuit(s) (ASIC). Processor(s) 210A-C may include one or more processors (homogenous or heterogeneous), which may be arranged for parallel processing, as clusters and/or as one or more multi-core processing units.

Each respective mobile device 202A-C includes one or more program stores 212A-C (i.e., data storage devices) that store code instructions for execution by respective processing units 210A-C. For example, a random access memory (RAM), read-only memory (ROM), and/or a storage device, for example, non-volatile memory, magnetic media, semiconductor memory devices, hard drive, removable storage, and optical media (e.g., DVD, CD-ROM).

Each mobile device 202A-C includes locally stored code instructions that perform one or more of the acts described with reference to FIG. 1. For example, each mobile device 202A-C may store installation code 206B that executes during a booting process and/or during another time of operation of the respective mobile device, and may access server 208 over a network 213 using a respective cellular communication channel 214A-C (e.g., as described herein with reference to FIG. 1). Each mobile device 202A-C may store distribution code 206C that distribute content item(s) 206A originally obtained from server 208 over network 213 using a cellular communication channel (e.g., as described with reference to FIG. 1).

Each mobile device 202A-C may include a respective data repository 216A-C (i.e., data storage device) for storing data. Respective data repositories 216A-C may be implemented as, for example, a memory, a local hard-drive, a removable storage unit, an optical disk, a storage device. It is noted that content item(s) 206A, installation code 206B, and/or distribution code 206C may be stored in respective data repositories 216A-C, with executing portions loaded into respective program store 212A-C for execution by respective processor(s) 210A-C.

Each mobile device 202A-C includes a respective cellular interface 218A-C for communicating with network 213 over a cellular communication channel using, for example, LTE), WiMax, HSPA, and/or EV-DO. Cellular interface 218A-C includes physical and/or virtual components, for example, one or more of, antenna(s), network interface card(s), a virtual interface implemented in software, network communication software providing higher layers of network connectivity, an application programming interface (API), a software development kit (SDK), and/or other implementations.

Each mobile device 202A-C includes a respective non-cellular interface 220A-C for communicating with other mobile devices over a non-cellular communication channel using, for example, Bluetooth® Direct, LTE Direct, and/or Wi-Fi Direct®. Non-cellular interface 220A-C includes physical and/or virtual components, for example, one or more of, antenna(s), a network interface card, a virtual interface implemented in software, network communication software providing higher layers of network connectivity, an application programming interface (API), a software development kit (SDK), and/or other implementations.

It is noted that the cellular and non-cellular interfaces may be implemented as a single component, or as two or more separate components.

Each mobile device 202A-C includes a respective user interface 222A-C that presents content item(s) 206A (or indications thereof, for example, icons) to the user, and/or is used by the user to enter data, for example, one or more of, a touchscreen, a display, a keyboard, a mouse, and voice activated software using speakers and microphone.

Server 208 may be implemented as, for example, a computing cloud, a network server, a web server, a virtual server, and/or other implementations. Server 208 may include processor(s) 210D (e.g., implemented as described with reference to processor(s) 210A-C), program store 212D (e.g., implemented as described with reference to program store 212A-C), and optionally a data repository 216D (e.g., implemented as described with reference to data repository 212A-C) that stores content item(s) 206A.

Referring now back to FIG. 1, for clarity, the method is described from the vantage point of a certain mobile device 202A, interacting with mobile devices 202B and 202C. However, one in the art understands that the method described with reference to FIG. 1 may be executed by the large number of mobile devices.

The acts described with reference to column 100A are performed at least in part by mobile device 202A, optionally by processor(s) 210A executing installation code 206B and/or distribution code 206C stored in program store 212A.

The acts described with reference to column 100B refer to data that is transmitted at least in part to server (e.g., 208), optionally over a cellular communication channel (e.g., 214A) established between mobile device 202A (and/or other mobile devices) and network 213 to access server 208.

The cellular communication channel (214A-C) defines a connection (e.g., network connection) established over a cellular network of a wireless service provider that connects the mobile devices 202A-C using a radio access network of the wireless service provider. Exemplary cellular communication channels may be based on one or more of the following technologies and/or protocols, for example, long term evolution (LTE), WiMax, HSPA, EV-DO.

The acts described with reference to column 100C refer to acts that involved one or more other mobile device(s) (e.g., 202B-C), optionally including data that is transmitted at least in part over a non-cellular communication channel (e.g., 204A-C). Non-cellular communication channel (204A-C) may be implemented as a short range non-cellular wireless communication channel. Non-cellular communication channel (204A-C) establishes direct communication (e.g., point to point) between respective mobile devices. Multiple non-cellular communication channels may be established between pairs of mobile devices, and/or other network topologies may be implemented, for example, ring, mesh, star, tree, line, fully connected, and the like). Non-cellular communication channel (204A-C) may provide for direct communication between connected mobile devices, without using a wireless access point (WAP) or other intermediate relay and/or routing device. Optionally, an intermediate mobile device may be used to relay and/or route data between two other mobile devices that are not in direct communication with one another (e.g., too far apart for direct communication). For example, mobile device 202A and mobile device 202B are connected using non-cellular communication channel 204A, mobile device 202A and mobile device 202C are connected using non-cellular communication channel 204B, and mobile device 202B and mobile device 202C are connected using non-cellular communication channel 204C. Exemplary non-cellular communication channel may be based on one or more of the following technologies and/or protocols, for example, Bluetooth® Direct, LTE Direct, and Wi-Fi Direct®.

At 102, installation instructions stored as installation code 206B are executed by processor(s) of mobile device 202A during a booting process and/or during another time when mobile device 202A is operating. Installation code 206B may be implemented as, for example, a script that is executed during the booting process and/or during another time when the mobile device is operating, an application that is executing during the booting process and/or during another time when the mobile device is operating, and/or a function that is implemented using a virtual interface (e.g., API, SDK).

Installation code 206B includes instructions to access server 208 over network 213 using cellular communication channel 214A, to receive instructions 206D for automatic installation of one or more content item(s) 206A on mobile device 202A. Content item(s) 206A are stored by (and/or in association with) server 208.

Installation code 206B is optionally pre-loaded on the mobile devices prior to being sold to the end user, for example, by the manufacturer, by the mobile operator, by the provider of the operating system, by a distributor of content items, and/or other entities.

Installation code 206B may be executed during one or more of: a first booting of the mobile device by the user (e.g., when the user first actives the mobile device after purchase), a reset of the mobile device, a reboot during activation of the mobile device after shutdown of the mobile device, during another time when the mobile device is operating, at pre-defined events (for example, once a week, once a month), and/or when instructions are received to execute installation code 206B (e.g., from server 208).

Optionally, the installation code 206B is associated with a permission level that executes without requiring user approval and/or without allowing intervention by the user. Alternatively or additionally, the automatic installation of content item(s) 206A is associated with the permission level that executes without requiring user approval and/or without allowing intervention by the user. Content item(s) 206A may be automatically installed without the user being necessary aware of the installation (e.g., background execution of installation code 206B and/or background execution of the instructions obtained from server 208) and/or without the user being able to intervene in stopping the installation.

Exemplary content item(s) 206A stored in association with server 208 for distribution to mobile devices (e.g., 202A-C) include: a new application (app), an update to an existing installed application, a media content item (e.g., a video, a picture, an image), an android application package (APK), a contact for a social network application, and an advertisement.

At 104, instructions 206D for automatic installation of content item(s) 206A on mobile device 202A are received from server 208. Instructions 206D are transmitted over cellular communication channel 214A established between mobile device 202A and server 208.

At 106, mobile device 202A detects other nearby mobile devices 202B-C for establishment of the non-cellular communication channel. The detection of the nearby mobile device may be triggered in response to receiving instructions 206D from server 208, and/or automatically performed as part of the booting process, and/or performed independently of the booting process (e.g., at another time during operation of the mobile device) and/or received instruction 206D.

The detection of nearby mobile devices 202B-C and establishment of non-cellular communication channels 204A-204B may be performed, optionally, by searching, by mobile device 202A, for signals broadcasted by mobile devices 202B and/or 202C optionally using respective non-cellular interfaces 220B and 2220C, indicative of availability for establishing the non-cellular communication channel. Alternatively or additionally, mobile device 202A may broadcast a message (e.g., using non-cellular interface 220A), to which mobile devices that are available for establishment of the non-cellular communication channel transmit a reply as a messaged directed to mobile device 202A and/or as a broadcast.

At 107, non-cellular communication channel(s) 204A-B between mobile device 202A and 202B and/or 220C is (are) established, for example, as defined by the implemented communication protocol.

At 108, mobile device 202A transmits a query to each mobile device 202B-C over respective established non-cellular communication channels 204A-B to determine whether each respective mobile device has installed thereon content item(s) 206A for installation on mobile device 202A defined by instructions 206D received from server 208. Alternatively, the transmission of the query described with reference to block 108, is performed before the establishment of the non-cellular communication channel(s) described with reference to block 107. In such a case, the establishment of the non-cellular communication channel(s) is performed with the mobile device(s) that responded indicating that the content item(s) is installed thereon, optionally the establishment of the non-cellular channel is performed in block 112.

At 110, when mobile device 202A is unable to receive a response to the transmitted query from any mobile device 202B-C, and/or when no non-cellular communication channels have been established with other mobile devices, and/or when the received responses do not include content item(s) 206A for installation defined by instructions 206D, mobile device 202A receives content item(s) 206A from server 208 over cellular communication channel 214A. Alternatively, at 112, one or more responses are received by mobile device 202A indicating that respective mobile devices 202B-C have stored thereon content item(s) 206A. The number of mobile devices that are storing content item(s) 206A may be smaller than the number of mobile devices having established non-cellular communication channels with mobile device 202A, for example, when some of the mobile devices have not yet installed content item(s) 206A. The sub-set of mobile devices that are storing content item(s) 206A may be referred to herein as a group of mobile devices that have the content item(s) 206A installed thereon.

Optionally, at 114, mobile device 202A computes a division of the content item(s) into multiple segments, for example, as individual packets, frames, or a group of packets and/or frames. The division into segments may be used to recover lost and/or missing segment(s) (from the same and/or another mobile device) by retransmission of the lost and/or missing segment(s). The division into segments may be used to receive different segments from two or more mobile devices, for example, to receive the segments in parallel from the two or more mobile devices. The division into segments may be used to receive segments out of order, which may be assembled into the correct order by mobile device 202A.

Mobile device 202A may transmit a request (optionally over the respective non-cellular communication channels) to receive certain segment(s) of content item(s) 206D from one or more members of the group of mobile devices that have content item(s) 206D stored thereon. Transmission requests may be iterated by mobile device 202A, by transmitting the next request in response to reception of the requested segment(s). The iteration may be performed in parallel to multiple client terminals, sequentially to one or more mobile devices, or non-sequentially (i.e., the segments do not have to be necessarily received sequentially or in any particular order, the process succeeds as long as all the segments are eventually received) and/or may include a repetition of transmission of the request when the requested segment(s) fail to arrive within a predefined time and/or arrive with unrecoverable errors.

The requests for different segments of the content item(s) may be transmitted substantially in parallel to different members of the group of mobile devices, for example out of order, or sequentially in order. The segments of the content item(s) may be received by mobile device 202A substantially in parallel from the different members of the group of mobile devices.

At 116, content item(s) 206D are received by mobile device 202A from one or more of the mobile devices 202B-C over the respective established non-cellular communication channels. The content item(s) may be received as segments, which are assembled by mobile device 202A into the content item(s).

At 118, content item(s) 206D is automatically installed on mobile device 202A according to instructions 206D received from server 208, using segments and/or content item(s) received from mobile device(s) 202B-C.

At 120, an indication of the automatically installed content item may be presented on user interface 222A (e.g., display) of mobile device 202A, for example, an icon to activate an installed app may be displayed. Alternatively, the automatic installation is performed without presenting on indication on the display, for example, when an existing app is automatically updated, no indication of the update is necessarily presented.

Optionally, at 122, mobile device 202A having content item(s) 206A installed thereon may provide the content item(s) to other mobile devices that are searching to install content item(s) 206A according to instructions 206D received from server 208, as described herein. Mobile device 202A may now perform the functions described herein with reference to mobile device 202B and/or mobile device 202C, by providing content item(s) 206A to other mobile devices.

Based on the method discussed with reference to FIG. 1, from the perspective of mobile device 202 having content item(s) 206A stored thereon:

Corresponding to block 106, mobile device 202A may broadcast (e.g., using non-cellular interface 220A) signals indicative of availability to establish a non-cellular communication channel. The broadcasts may be triggered by installation of content item(s). The broadcasts may be performed continuously, periodically at pre-defined intervals, triggered by events (e.g., message received from server 208) indicating to perform the broadcast, and/or performed in response to messages broadcasted by another mobile device searching to establish a non-cellular communication channel.

Corresponding to block 108, mobile device 202A receives from the other mobile device a request to establish the non-cellular communication channel. The non-cellular communication channel between mobile device 202A and the other mobile device is established.

Corresponding to block 116, mobile device 202A receives from the other mobile device, a request to receive one or more segments of content item(s) 202A installed on mobile device 202A. Alternatively or additionally, the received request is to receive content item(s) 202A.

The segment(s) of content item(s) 202A, and/or content item(s) 202A are transmitted over the non-cellular communication channel, from mobile device 202A to the other mobile device.

Figure 3:
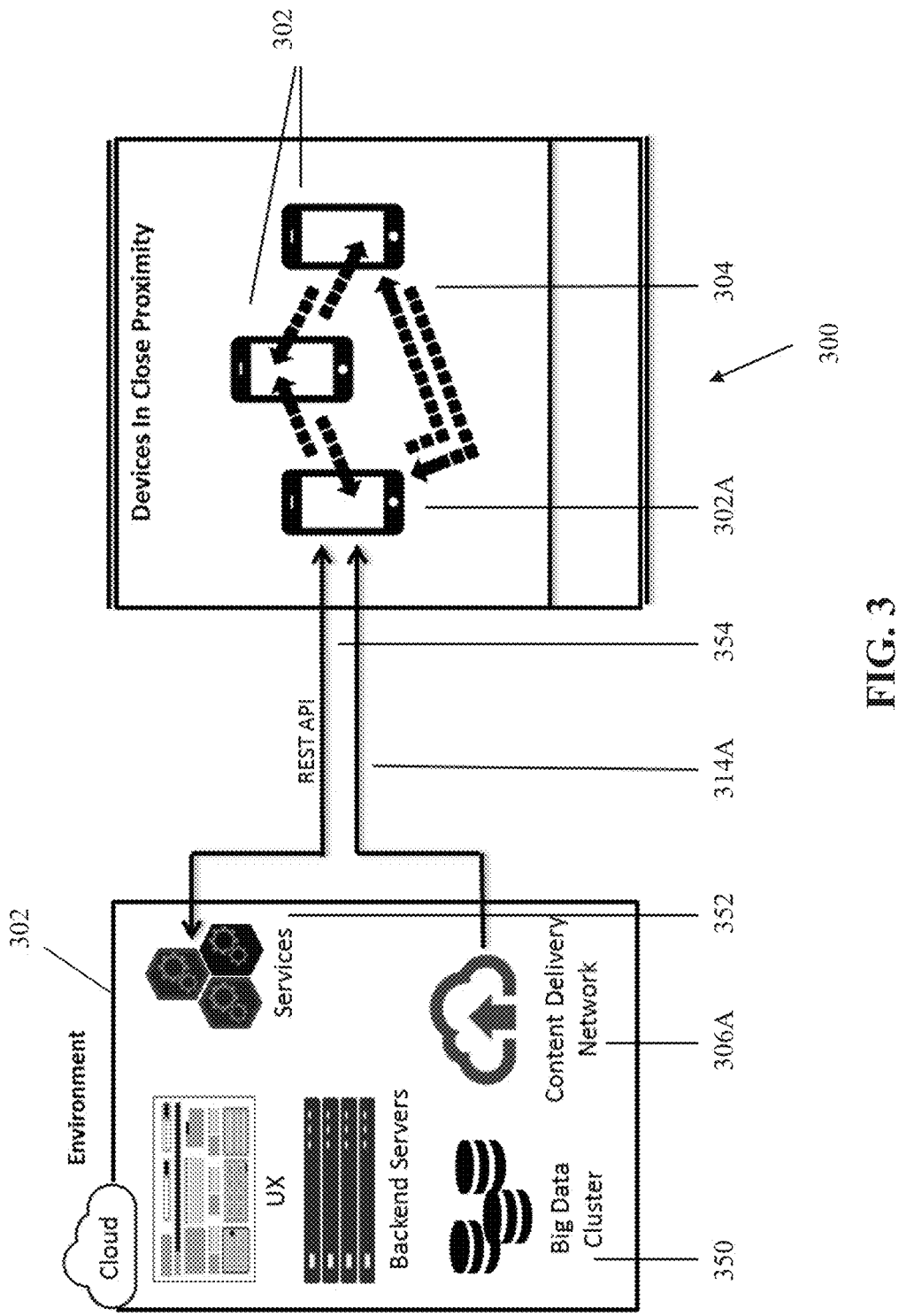
FIG. 3 is a schematic diagram of another exemplary system that distributes and automatically installs content item(s) on one or more mobile devices, in accordance with some embodiments of the present invention.

Reference is now made to FIG. 3, which is a schematic diagram of another exemplary system 300 that distributes content item(s) 306A from a server (optionally a computing cloud) 308 to mobile devices 302 over established non-cellular communication channels 304, where an initiator mobile device 302A having content item(s) 306A stored thereon provides content item(s) 306A to other mobile device(s) located in near proximity to mobile device 302A (i.e., within range to use the non-cellular communication channels 304) optionally upon request by the other mobile devices, in accordance with some embodiments of the present invention. Content items(s) 306A are automatically installed on mobile devices 302. One or more components of system 300 may correspond to components of system 200 described with reference to FIG. 2. One or more acts of the method described with reference to FIG. 1 may be implemented by system 300.

System 300 may include a data cluster (e.g., big data cluster) 350 that stores data driven definitions of object, operations, configurations (and the like) which may be used by one or more components of system 300 (and/or of system 200).

Content items(s) 306A for distribution to mobile devices 302 may be stored within a content delivery network.

System 300 may include a set of rest services 352 used by mobile devices 302 to register with server 302 (and/or with another computing device) to receive operational information.

Content item(s) 306A are distributed to initiator mobile device 302A over a first cellular channel 314A, using a defined set of protocols and/or technology.

Mobile devices 302 may communicate with server 302 and/or rest services 352 over a second cellular channel 354, optionally using a rest API. First cellular channel 314A and second cellular channel 354 may be different channels (e.g., separate frequencies, separate communication paths), or a common channel (common frequency, common communication path).

Non-cellular communication channel 304 is used by mobile devices 302 located in proximity to one another to communicate with one another, optionally using direct communication.

Figure 4:
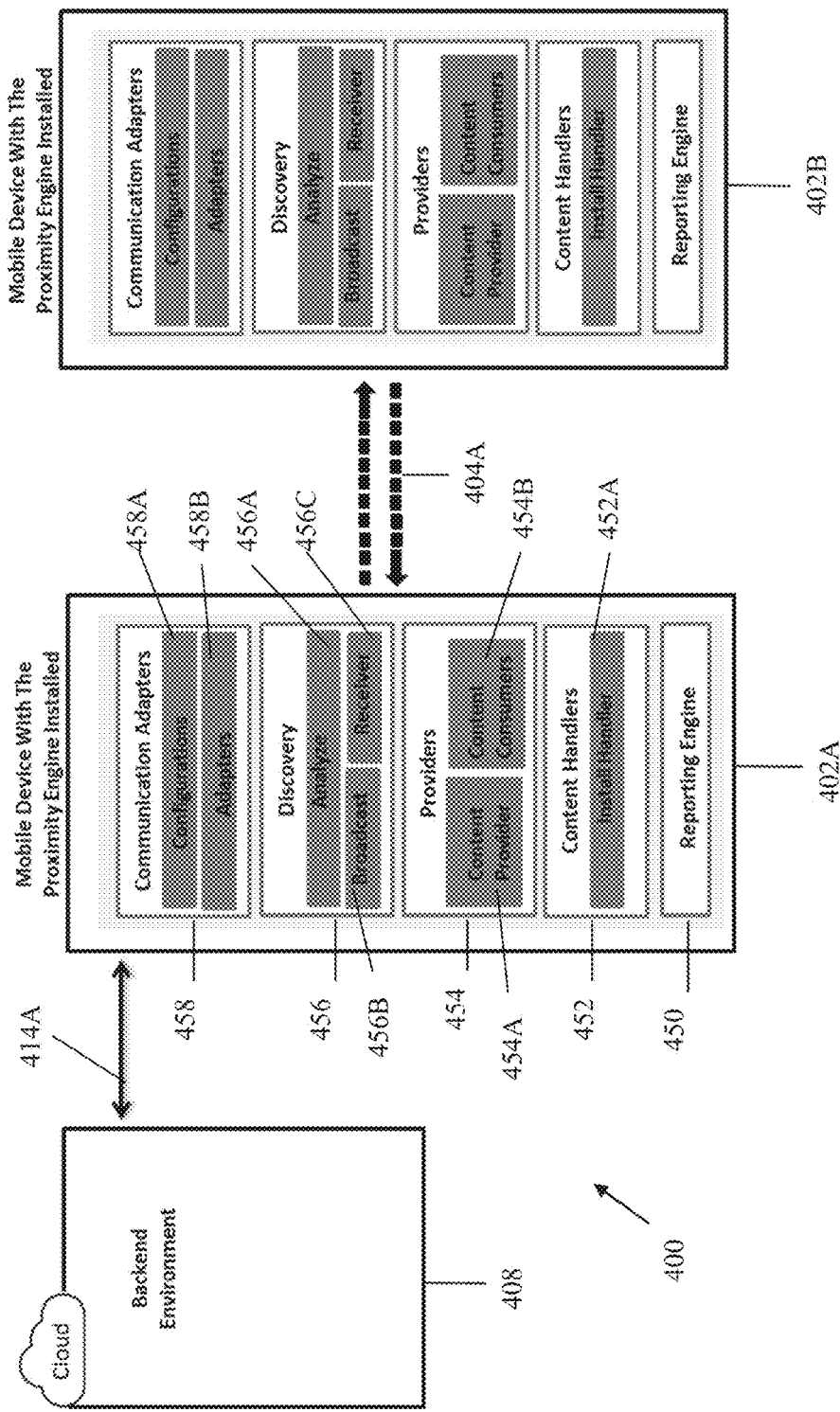
FIG. 4 is a schematic diagram of exemplary components of an exemplary system that distributes and automatically installs content item(s) on one or more mobile devices, in accordance with some embodiments of the present invention.

Reference is now made to FIG. 4, which is a schematic diagram of an exemplary system 400 that includes exemplary components of mobile devices 402A-B that distribute content item(s) from mobile device 402A that received content item(s) from server 408 over a cellular communication channel 414A, to mobile device 402B that requests the content item(s), over a non-cellular communication channel, in accordance with some embodiments of the present invention. The content items(s) are automatically installed on mobile devices 402A-B. One or more components of mobile devices 402A-B may be implemented as components of mobile devices 202A-C described with reference to FIG. 2. One or more acts of the method described with reference to FIG. 1 may be implemented by system 400.

Mobile devices 402A-402B may include a reporting engine 450 (e.g., code stored in a data repository of the mobile device, executed by a processor(s) of the mobile device) that reports back to server 408 with significant operational events over cellular communication channel 414A.

Mobile devices 402A-402B include a content handler 452 (e.g., code stored in a data repository of the mobile device, executed by a processor(s) of the mobile device) that provides pre-defined handlers that process different types of content, dependent on the content type. For example, an install handler 452A is a pre-defined handler handles installation of APKs. The install handler may be installed in the priv-app partition to install the apps without user approval and/or intervention.

Mobile devices 402A-402B may include a provider layer 454 (e.g., code stored in a data repository of the mobile device, executed by a processor(s) of the mobile device) that includes a content provider code 454A, and a content consumer code 454B for different content types.

Mobile devices 402A-402B includes a discovery layer 456 (e.g., code stored in a data repository of the mobile device, executed by a processor(s) of the mobile device) that detects mobile devices located in near proximity for establishment of non-cellular communication channel 404A. Discovery layer 456 may include an analyze module 456A that analyzes the current role of the respective mobile device, whether the respective mobile device is to broadcast availability of the content item(s) to other mobile device(s), or receive transmissions of the content item(s) from other mobile device(s). According to the analysis, the broadcast handler 456B or the receiver handler 456C is activated. The broadcast handler broadcasts (non-cellular) to nearby mobile devices that the respective mobile device is available to provide content item(s), or that the respective mobile device is looking to receive (e.g., download) a certain content item(s). The broadcast message may include, for example, the identifier of the respective mobile device that is broadcasting and the message type (e.g., requestContent, keepAlive). The receiver module receives a broadcast from another mobile device and according to the message type, determines how to respond, and which content provider code to activate.

Mobile devices 402A-402B may include a communication adapter layer 458 (e.g., code stored in a data repository of the mobile device, executed by a processor(s) of the mobile device) that defines and/or determines the communication protocol for implementing the non-cellular communication channel between the mobile devices. Layer 458 may include a configuration module 458A that defines the available and/or preferred communication protocol, and which adapter 458B to use (e.g., Bluetooth® Direct, LTE Direct, and Wi-Fi Direct®). The defined configuration may be received (e.g., periodically, at defined events, when updated) from server over cellular communication channel 414A.

Non-cellular communication channel 404A may be defined according to a transportation layer (e.g., code stored in a data repository of the mobile device, executed by a processor(s) of the mobile device, and/or hardware) that provides data transportation between the mobile devices. The transportation protocol may vary according to the protocol supported by the proximity engine.

Figure 5:
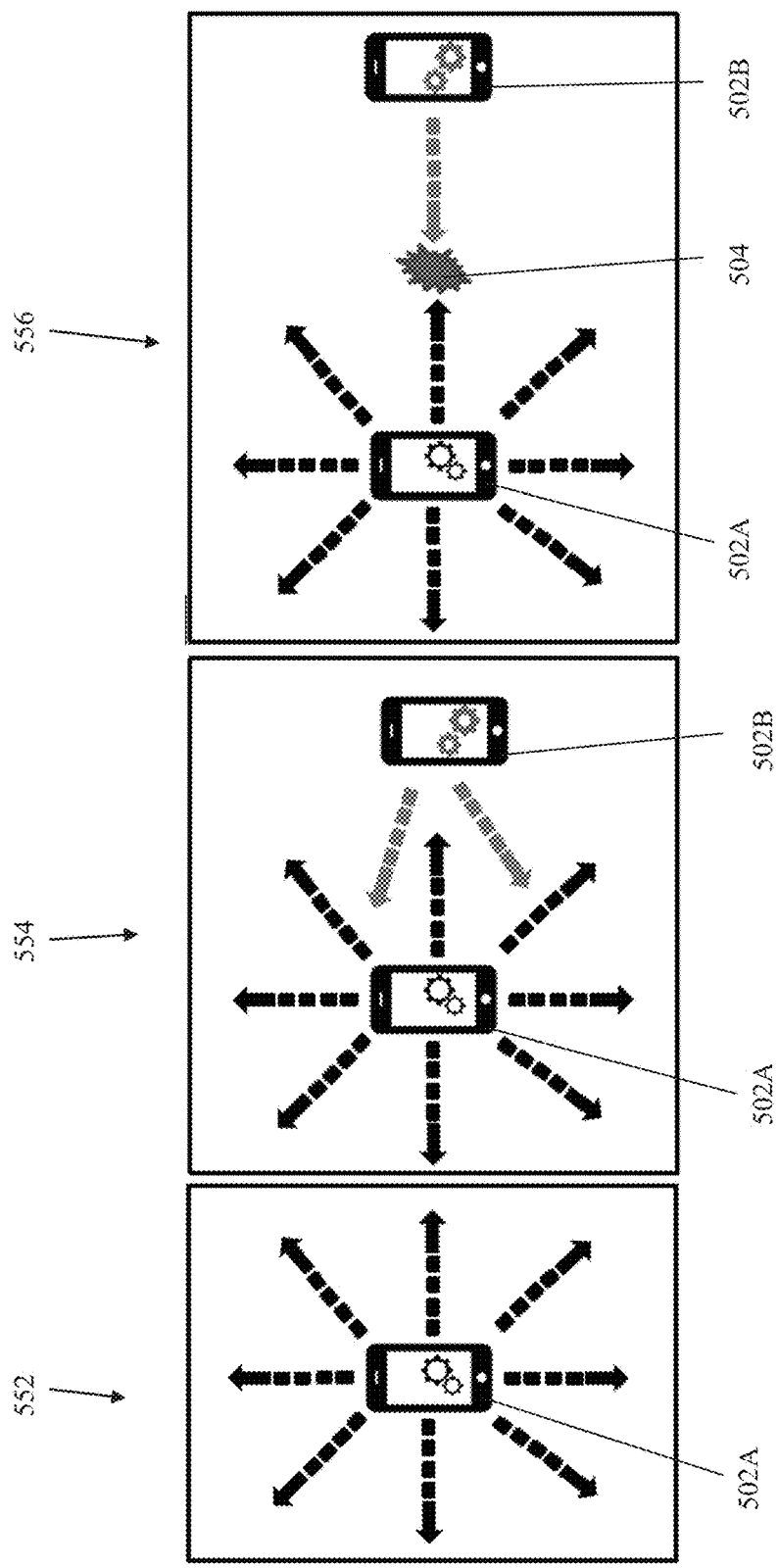
FIG. 5 is a schematic diagram that graphically depicts an exemplary process of establishing a non-cellular communication channel between mobile devices, in accordance with some embodiments of the present invention.

Reference is now made to FIG. 5, which is a schematic diagram that graphically depicts an exemplary process of establishing a non-cellular communication channel for transfer of content items from a mobile device 502A that has the content item(s) stored thereon to another mobile device 502B that is instructed to install the content item(s), in accordance with some embodiments of the present invention. FIG. 5 corresponds to act 106 described with reference to FIG. 1, and/or may be implemented by components of system 200 described with reference to FIG. 2.

At 552, mobile device 502A broadcasts messages (i.e., signals) optionally using the non-cellular communication interface, denoting the availability to establish a non-cellular communication channel for proving content item(s) stored thereon. The messages are broadcasted within a broadcast region, for example, as defined by the protocol used for establishment of the non-cellular communication channel, and/or transmission power of the antenna of the mobile device, and/or capabilities of the antenna of the mobile device.

At 554, mobile device 502B searches for and/or receives the broadcast from mobile device 502A. Mobile device 502B is within the broadcast region, for example, when mobile device 502B moves geographically into the broadcast region, and/or when executing the code instructions to search for the broadcast.

At 556, mobile devices 502A and 502B establish the non-cellular communication channel 504 used to transmit content item(s) from mobile device 502A to mobile device 502B, as described herein.

Figure 6:
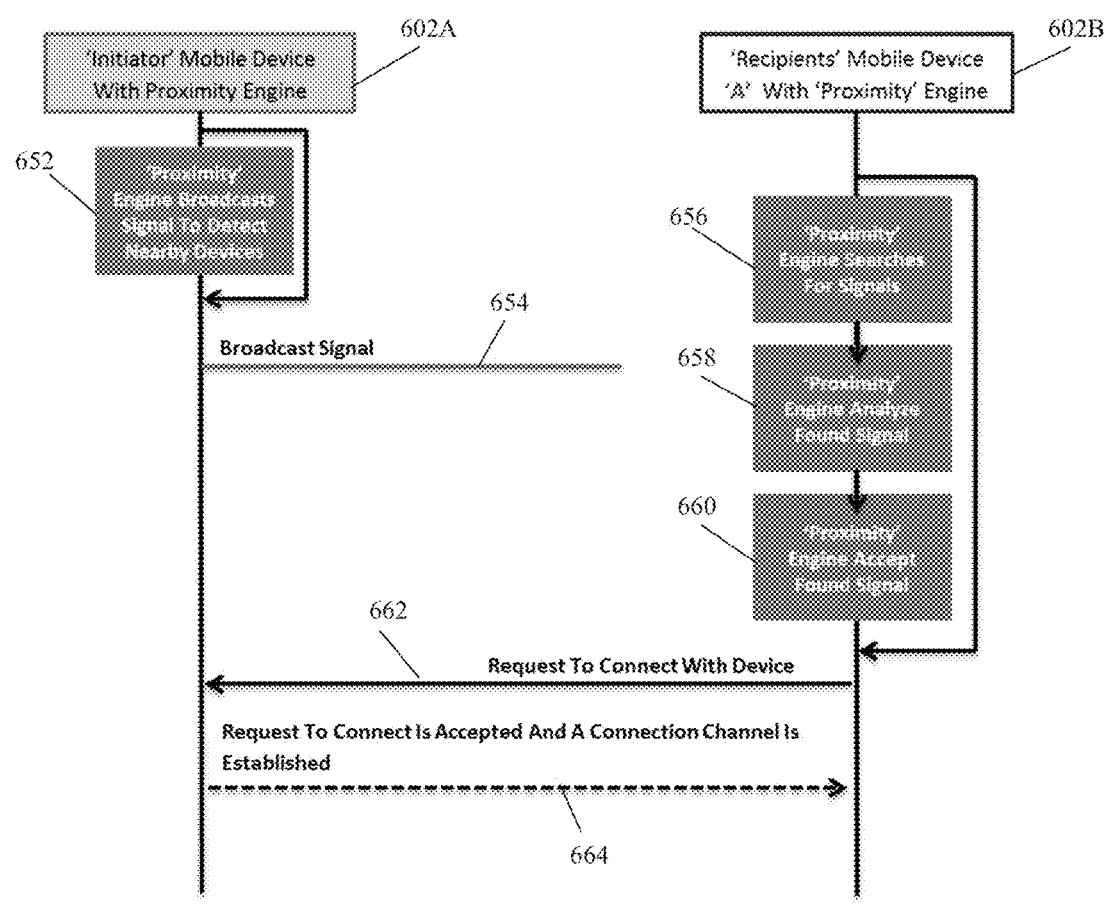
FIG. 6 is a dataflow diagram that graphically depicts an exemplary process of establishing a non-cellular communication channel between mobile devices, in accordance with some embodiments of the present invention.

Reference is now made to FIG. 6, which is a dataflow diagram that depicts an exemplary process of establishing a non-cellular communication channel for transfer of content items from a mobile device 602A that has the content item(s) stored thereon to another mobile device 606B that is instructed to install the content item(s), in accordance with some embodiments of the present invention. FIG. 6 corresponds to act 106 described with reference to FIG. 1, and/or may be implemented by components of system 200 described with reference to FIG. 2.

At 652, mobile device 602A broadcasts a message(s) 654 (i.e., signal), optionally using the non-cellular communication interface, denoting the availability to establish a non-cellular communication interface for proving content item(s) stored thereon. The messages are broadcasted within a broadcast region, for example, as defined by the protocol used for establishment of the non-cellular communication channel, and/or transmission power of the antenna of the mobile device, and/or capabilities of the antenna of the mobile device.

At 656, mobile device 602B searches for the broadcast signals.

At 658, mobile device 602B receives and analyzes broadcast signals 654.

At 660, mobile device 602B identifies broadcast signals 654 as being indicative of originating from a mobile device available to provide content item(s) over a non-cellular communication channel.

At 662, mobile device 602B transmits (using the non-cellular communication interface) a request to mobile device 602A to establish the non-cellular communication channel.

At 664, the request is accepted by mobile device 602A and the non-cellular communication channel is established.

Figure 7:
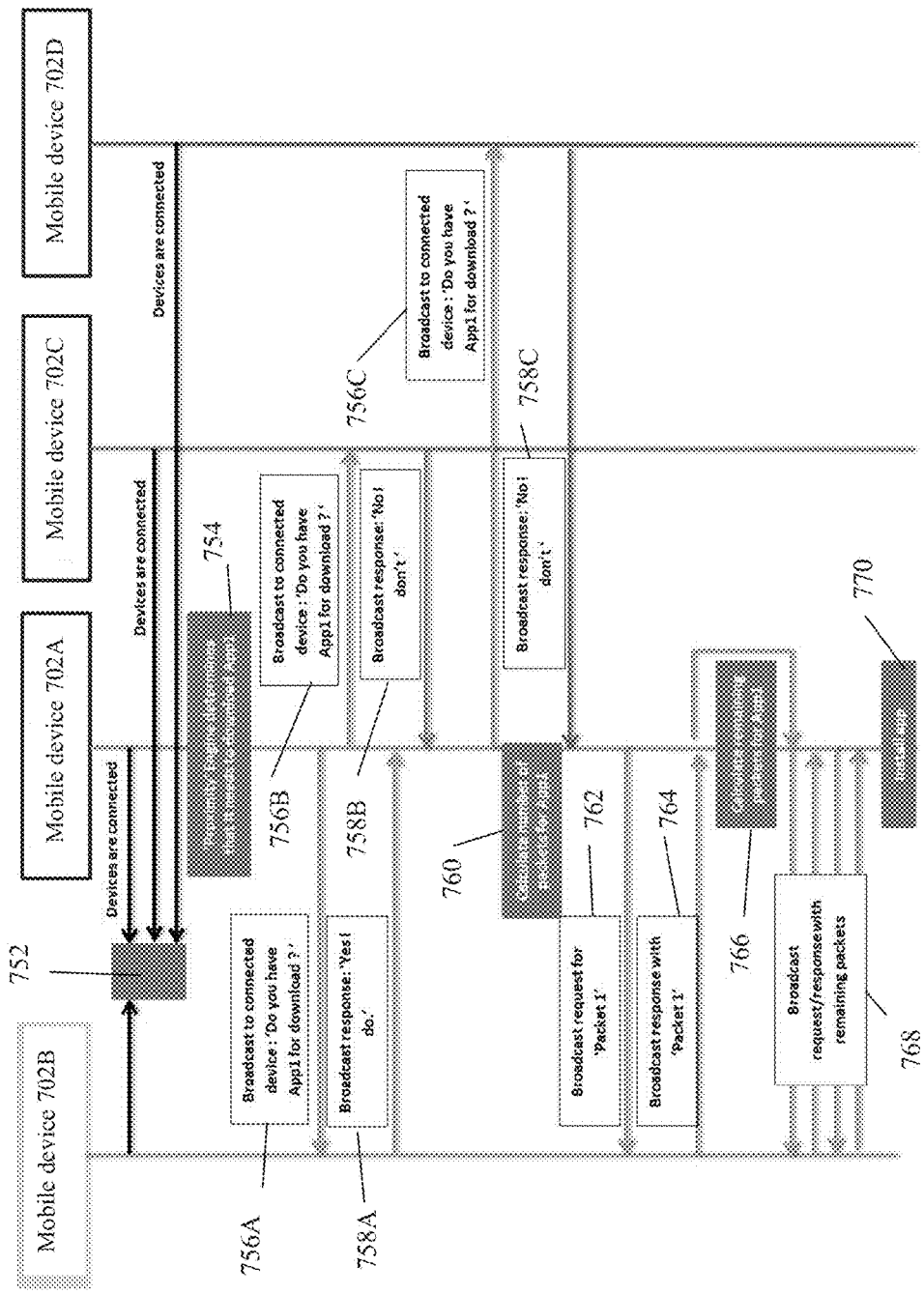
FIG. 7 is a dataflow diagram that depicts an exemplary process of a mobile device receiving content item(s) from another mobile device over a non-cellular communication channel, in accordance with some embodiments of the present invention.

Reference is now made to FIG. 7, which is a dataflow diagram that depicts an exemplary process of a mobile device 702A receiving content item(s) from a mobile device 702B over a non-cellular communication channel, in accordance with some embodiments of the present invention. FIG. 7 corresponds to acts 107-118 described with reference to FIG. 1, and/or may be implemented by components of system 200 described with reference to FIG. 2.

At 752, one or more non-cellular communication channels are established between mobile devices 702A-D, as described herein.

At 754, mobile device 702A receives instructions to install App1. The instructions are optionally received from a server over a cellular channel, as part of a booting process and/or at another time during operation of the mobile device, as described herein.

At 756A-C, mobile device 702A broadcasts a message using the established non-cellular communication channel to mobile devices 702B-D requesting App1. The message is broadcasted to determine which of mobile devices 702B-D has App1 installed thereon and available for transmission to mobile device 702A.

At 758A-C, response messages are received by mobile device 702A to the broadcasted message from mobile devices 702B-D over the established non-cellular communication channel. Response message 758A indicates that mobile device 702B has App1 stored thereon. Response messages 758B-C indicate that mobile devices 702C-D do not have App1 stored thereon.

At 760, mobile device 702A calculates the number of segments (e.g., packets) for App1, as described herein.

At 762, mobile device 702A transmits a request over the established non-cellular communication channel to mobile device 702B requesting the first segment (e.g., Packet 1).

At 764, mobile device 702A receives the first segment (e.g., Packet 1) from mobile device 702B over the established non-cellular communication channel.

At 766, mobile device 702A determines the remaining segments (e.g., packets) for App1.

At 768, the process of transmitting a request for the next remaining segment and receiving the next remaining segment (as discussed with reference to dataflow 762-764) is iterated.

At 770, the received segments are assembled and App1 is automatically installed on mobile device 702A, as described herein.

It is noted that mobile device 702A having App1 installed thereon may provide App1 to mobile devices 702C-D, as described herein.

Figure 8:
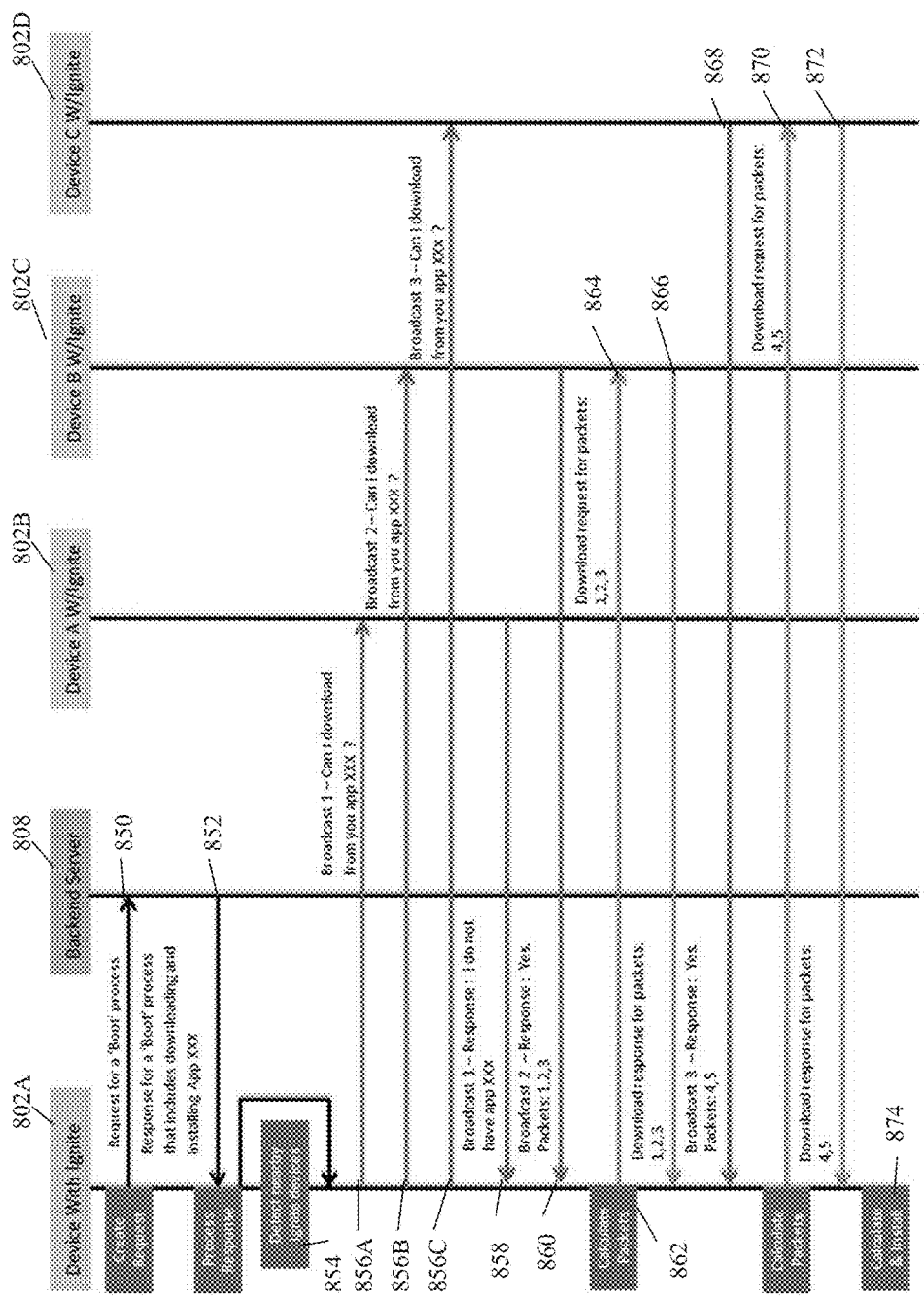
FIG. 8 is a dataflow diagram that depicts an exemplary process of a mobile device receiving content item(s) from multiple mobile devices over a non-cellular communication channel, in accordance with some embodiments of the present invention.

Reference is now made to FIG. 8, which is a dataflow diagram that depicts an exemplary process of a mobile device 802A receiving content item(s) from mobile devices 802C-D over a non-cellular communication channel, in accordance with some embodiments of the present invention. FIG. 8 corresponds to acts 102-118 described with reference to FIG. 1, and/or may be implemented by components of system 200 described with reference to FIG. 2.

At 850, mobile device 802A requests instructions for a boot process from server 808 over a cellular communication channel. The request is transmitted as part of a booting process of mobile device 802A and/or during another time of operation of mobile device 802A.

At 852, mobile device 802A receives the instructions from server 808 over the cellular communication channel. The received instructions define automatic downloading and installation of a certain App.

At 854, mobile device 802A detects nearby mobile devices 802B-D that are available to establish a non-cellular communication channel.

At 856A-C, mobile device 802A transmits a request using the non-cellular communication interface (optionally over the established non-cellular communication channel) to devices 802B-D to determine which devices are available to provide the certain App (i.e., are storing the certain App thereon).

At 858, a reply to the request is transmitted over the established non-cellular communication channel by mobile device 802B to mobile device 802A. The reply is indicative that mobile device 802B does not have the certain App stored thereon. It is noted that the negative reply is optional, as no reply may be assumed to be a negative reply.

At 860, a reply to the request is transmitted over the established non-cellular communication channel by mobile device 802C to mobile device 802A. The reply is indicative that mobile device 802C is storing the certain App, and is available to provide the certain App.

At 862, mobile device 802A computes segments (e.g., packets) for the certain App.

At 864, mobile device 802A transmits a request over the established non-cellular communication channel to mobile device 802C to receive certain segments of the certain App, optionally the first sequential set of segments according to the computation.

At 866, mobile device 802A receives the requested segments from mobile device 802C over the established non-cellular communication channel.

At 868, a reply to the request (in 856C) is transmitted over the established non-cellular communication channel by mobile device 802D to mobile device 802A. The reply is indicative that mobile device 802D is storing the certain App, and is available to provide the certain App.

At 870, mobile device 802A transmits a request over the established non-cellular communication channel to mobile device 802D to receive the next set of segments of the certain App, optionally according to a computed segmentation sequence.

At 872, mobile device 802A receives the requested next set of segments from mobile device 802D over the established non-cellular communication channel.

At 874, mobile device 802A assembles the received segments (e.g., according to the computed order) and installed the certain App thereon.

It is noted that mobile device 802A having the certain App installed thereon is available to provide the certain App to mobile device 802B.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant content items, servers, and mobile devices will be developed and the scope of the terms content items, servers, and mobile devices are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computer implemented method for distribution and installation of a content item on mobile devices, the method executed by a first mobile device, the method comprising:
   receiving from a server over a cellular communication channel, instructions for automatic installation of the content item, wherein the content item is stored by the server;
   transmitting to at least one second mobile device, a query to determine whether the at least one second mobile device has installed thereon the content item;
   establishing a non-cellular communication channel with a group of the at least one second mobile devices that have the content item installed thereon;
   receiving over the non-cellular communication channel, the content item from at least one member of the group of the at least one second mobile devices;
   computing, a division of the content item into a plurality of segments;
   transmitting over the non-cellular communication channels to a certain member of the group of the at least one second mobile devices, a request to receive a certain segment of the content item;
   receiving over the non-cellular communication channels, from the certain member of the group of the at least one second mobile devices, the certain segment of the content item; and
   iterating the transmitting and the receiving for all segments of the plurality of segments of the content item;
   automatically installing the content item using the plurality of segments and according to the instructions; and
   presenting an indication of the automatically installed content item.

2. The method of claim 1, further comprising before the transmitting:
   searching for signals broadcasted by at least one second mobile device;
   wherein the establishing the non-cellular communication channel is performed with the at least one second mobile device that broadcasted the signals; and
   wherein the transmitting the query is performed after the establishment of the non-cellular communication channel.

3. The method of claim 1, wherein at least two segments of the content item are each respectively requested from at least two members of the group of the at least one second mobile devices.

4. The method of claim 1, wherein the plurality of segments of the content item are received in a non-sequential order, by iterating the transmitting the request of a next segment when an earlier segment is received.

5. The method of claim 1, wherein requests for different segments of the content item are transmitted substantially in parallel to different members of the group of the at least one second mobile device, and the plurality of segments of the content item are received substantially in parallel from the different members of the group of the at least one second mobile device.

6. The method of claim 1, wherein when no non-cellular communication channels are established with any second mobile devices, the content item is received from the server over the cellular communication channel.

7. The method of claim 1, further comprising:
   receiving from a third mobile device, a request for at least one segment of the automatically installed content item;
   establishing the non-cellular communication channel with the third mobile device; and
   transmitting over the non-cellular communication channel the at least one segment of the content item to the third mobile device.

8. The method of claim 7, further comprising, prior to the receiving the request from the third mobile device:
   broadcasting signals indicative of availability to establish a non-cellular communication channel; and
   receiving from the third mobile device, a request to establish the non-cellular communication channel.

9. The method of claim 1, wherein the instructions for automatic installation of the content item are received from the server during a first booting of the first mobile device.

10. The method of claim 1, wherein the instructions for automatic installation of the content item are received from the server during at least one of: a reset of the first mobile device, and a reboot after shutdown of the first mobile device.

11. The method of claim 1, wherein the content item is a member selected from the group consisting of: a new application, an update to an existing installed application, an android application package (APK), a media content item, a video, a picture, an image, a contact for a social network application, and an advertisement.

12. The method of claim 1, wherein the first mobile device is a member selected from the group consisting of: smartphone, glasses computer, and watch computer.

13. The method of claim 1, wherein the cellular communication channel is a network connection over a cellular network of a wireless service provider that connects to the first mobile device using a radio access network of the wireless service provider, and the non-cellular communication channel is a short range non-cellular wireless communication channel that establishes direct communication with each of the at least one second mobile devices without using a wireless access point (WAP).

14. The method of claim 1, wherein the cellular communication channel is a member selected from the group consisting of: long term evolution (LTE), WiMax, HSPA, EV-DO, and wherein the non-cellular communication channel is a member selected from the group consisting of: Bluetooth® Direct, Wi-Fi Direct®.

15. The method of claim 1, wherein the instructions to access the server, and the automatic installation of the content item are stored as code having at least one of: a permission level that executes without requiring user approval, and that prevents intervention by the user during the automatic installation of the content item.

16. A system for distribution and installation of content items on mobile devices, comprising:
- a non-transitory memory having stored thereon a code for execution by at least one processor of a first mobile device adapted to execute the code, the code comprising:
- code for receiving during a booting process, from a server over a cellular communication channel, instructions for automatic installation of the content item, wherein the content item is stored by the server;
- code for transmitting to at least one second mobile device, a query to determine whether the at least one second mobile device has installed thereon the content item;
- code for establishing a non-cellular communication channel with a group of the at least one second mobile devices that have the content item installed thereon; and
- code for receiving over the non-cellular communication channel, the content item from at least one member of the group of the at least one second mobile devices;
- code for computing, a division of the content item into a plurality of segments;
- code for transmitting over the non-cellular communication channels to a certain member of the group of the at least one second mobile devices, a request to receive a certain segment of the content item;
- code for receiving over the non-cellular communication channels, from the certain member of the group of the at least one second mobile devices, the certain segment of the content item; and
- code for iterating the transmitting and the receiving for all segments of the plurality of segments of the content item;
- code for automatically installing the content item using the plurality of segments and according to the instructions; and
- code for presenting an indication of the automatically installed content item.

17. A computer program product comprising a non-transitory computer readable storage medium storing program code thereon for implementation by at least one processor of a first mobile device, comprising:
- instructions for receiving during a booting process, from a server over a cellular communication channel, instructions for automatic installation of the content item, wherein the content item is stored by the server;
- instructions for transmitting to at least one second mobile device, a query to determine whether the at least one second mobile device has installed thereon the content item;
- instructions for establishing a non-cellular communication channel with a group of the at least one second mobile devices that have the content item installed thereon;
- instructions for receiving over the non-cellular communication channel, the content item from at least one member of the group of the at least one second mobile devices;
- instructions for computing, a division of the content item into a plurality of segments;
- instructions for transmitting over the non-cellular communication channels to a certain member of the group of the at least one second mobile devices, a request to receive a certain segment of the content item;
- instructions for receiving over the non-cellular communication channels, from the certain member of the group of the at least one second mobile devices, the certain segment of the content item; and
- instructions for iterating the transmitting and the receiving for all segments of the plurality of segments of the content item;
- instructions for automatically installing the content item using the plurality of segments and according to the instructions; and
- instructions for presenting an indication of the automatically installed content item.

* * * * *